United States Patent [19]

Hutton

[11] Patent Number: 5,080,303
[45] Date of Patent: Jan. 14, 1992

[54] GEARBOX BREATHER OUTLET

[75] Inventor: Peter E. Hutton, Chellaston, England

[73] Assignee: Rolls-Royce plc, London, England

[21] Appl. No.: 627,980

[22] Filed: Dec. 17, 1990

[30] Foreign Application Priority Data

Jan. 30, 1990 [GB] United Kingdom ............. 9002028

[51] Int. Cl.[5] ............................................. B64D 29/00
[52] U.S. Cl. .................................................. 244/53 R
[58] Field of Search .................... 244/53 R, 57, 129.1

[56] References Cited

U.S. PATENT DOCUMENTS

| | | | |
|---|---|---|---|
| 2,198,229 | 4/1940 | Price | 244/53 R |
| 2,207,242 | 7/1940 | DeSeversky | 244/53 R |
| 2,221,905 | 11/1940 | Berlin | 244/53 R |
| 2,231,239 | 2/1941 | Wright et al. | 244/53 R |
| 4,172,572 | 10/1979 | Doig et al. | 244/53 R |

Primary Examiner—Joseph F. Peters, Jr.
Assistant Examiner—Linda L. Palomar
Attorney, Agent, or Firm—Cushman, Darby & Cushman

[57] ABSTRACT

A breather outlet for the gearbox of an aircraft mounted gas turbine engine comprises an aerodynamic mast which extends from the engine nacelle. The mast contains a breather duct which interconnects the interior of the gearbox with an exhaust outlet. The exhaust outlet is generally rearwardly facing and is spaced apart from the engine nacelle so as to avoid oil staining of the nacelle.

6 Claims, 1 Drawing Sheet

GEARBOX BREATHER OUTLET

BACKGROUND OF THE INVENTION

1. Field of the Invention

This invention relates to a gearbox breather outlet and in particular to a gearbox breather outlet suitable for an aircraft mounted gas turbine engine.

2. Background Information

Aircraft mounted gas turbine engines are usually provided with a gearbox which is driven by the engine and provides drive for certain engine accessories. Such gearboxes are oil lubricated and are provided with so-called "breather" outlets to provide communication between the gearbox interior and the exterior of the engine. This is to ensure that the operation of the gearbox does not result in an air pressure build-up within the gearbox casing. Inevitably, operation of the gearbox results in severe agitation of the oil within the gearbox to the extent that an oil mist is usually formed. This oil mist can escape through the gearbox breather outlet and so it is common to provide a centrifuge device in the breather to separate out the oil mist before it is ejected from the engine. Unfortunately such structures are not completely effective in providing the capture of all of the oil mist so that some oil is inevitably lost through the breather outlet. The magnitude of the oil loss under these circumstances is not great and does not normally present any problems in the effective operation of the gearbox. However the oil which is ejected from the breather outlet, which is typically fitted flush with the engine nacelle, tends to cause dark colored stains along the engine nacelle. The problem is particularly acute in the case of nacelles which have a light color.

Such stains are seen as being highly undesirable since they are unsightly and are very difficult and time consuming to remove by normal cleaning methods.

SUMMARY OF THE INVENTION

Consideration has been given to providing a breather outlet which is in the form of a mast extending normal to the engine nacelle, the oil/air mixture from the gearbox being exhausted from the end of the mast remote from nacelle in a direction generally normal to the airflow over the nacelle. It has been found with such masts, however, that the air turbulence which they create tends to result in at least some of the exhausted oil to flow into contact with the nacelle, thereby causing staining. A further undesirable feature of such masts is that they cause a certain degree of drag which provides a penalty in terms of overall engine performance.

It is an object of the present invention to provide a gas turbine engine breather outlet which substantially avoids oil staining of the engine nacelle in the region of the outlet.

According to the present invention, a breather outlet suitable for use with the gearbox of an aircraft mounted gas turbine engine comprises a mast adapted to be located on the nacelle of the engine, said mast being aerodynamically shaped and containing a breather duct, said breather duct being operationally interconnected with the interior of said gearbox and having an exhaust outlet which is generally rearwardly facing with respect to the operational flow of air over said mast, and spaced apart from the nacelle upon which said mast is operationally mounted.

BRIEF DESCRIPTION OF THE DRAWINGS

The invention will now be described, by way of example, with reference to the accompanying drawings in which.

DETAILED DESCRIPTION OF THE PREFERRED EMBODIMENTS

Figure 1:
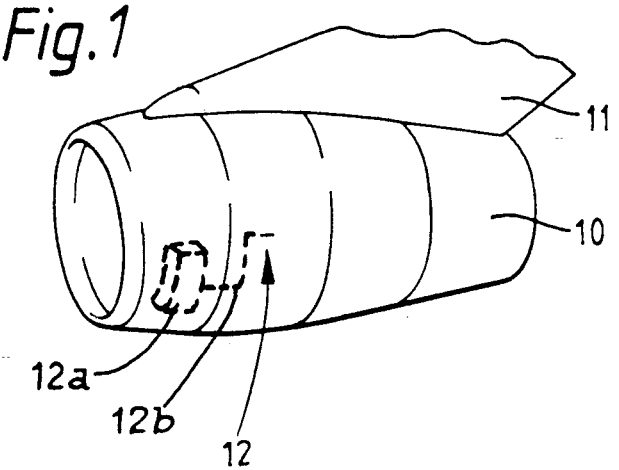
FIG. 1 is a general view of an aircraft mounted gas turbine engine nacelle incorporating a breather outlet in accordance with the present invention.

With reference to FIG. 1, a gas turbine engine nacelle 10 containing a propulsive gas turbine engine is suspended from an aircraft (not shown) by means of a mounting pylon 11. The gas turbine engine within the nacelle 10 is provided with a gear box 12a having a breather interconnection 12b, the outlet of that breather interconnection 12b being indicated at 12. The breather outlet can be seen more clearly in FIG. 2.

Figure 2:
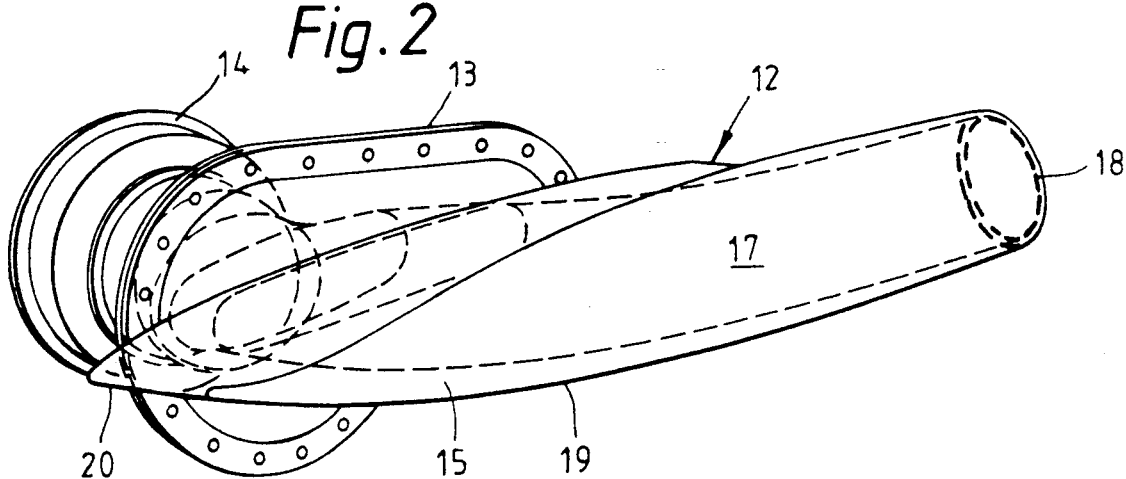
FIG. 2 is a close-up view of the breather outlet mounted on the nacelle shown in FIG. 1, shown in ghost form to reveal its internal configuration.

Referring to FIG. 2, the breather outlet 12 extends through an apertured seal plate 13 provided on the surface of the nacelle 10. That portion of the breather outlet 12 within the nacelle includes a transition piece connector 14 which facilitates an interconnection between the breather outlet 12 and the interior of the previously mentioned gearbox.

That portion of the breather outlet 12 which lies outside of the nacelle 10 comprises an aerodynamic mast 15. The mast 15 contains a duct 17 which interconnects the gearbox interior with an exhaust outlet 18. The exhaust outlet 18 is so positioned in the mast 15 that it is generally rearwardly facing with respect to the operational air flow over the nacelle. Moreover the exhaust outlet 18 is so positioned that it is spaced apart by approximately 12 cms from the surface of the nacelle 10.

Figure 3:
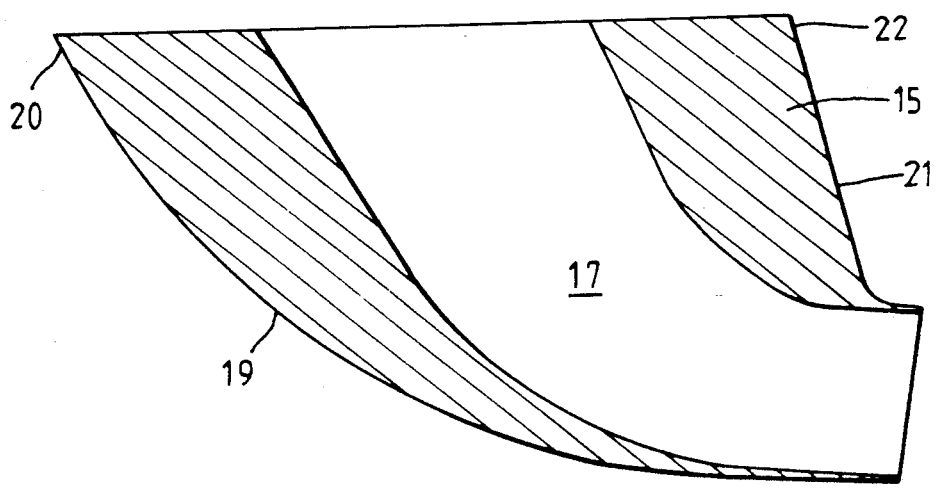
FIG. 3 is a sectioned plan view of a part of the breather outlet shown in FIG. 2.

The breather duct 17, which is shown in greater clarity in FIG. 3, is so arranged that its cross-sectional configuration changes from a slot shape as it exits from the nacelle 10 to a circular cross-sectional shape and its exhaust outlet 18. It can also be seen from FIG. 3 that the plane of the exhaust outlet 18 is canted so as to be directly slightly away from the nacelle 10. This is to decrease still further the possibility of oil coming into contact with the nacelle 10.

The mast 15 has a leading edge 19, with respect to the operational flow of air thereover, which is curved in a convex manner. Specifically the leading edge 19 extends from the most upstream part 20 of the mast 15 to the exhaust outlet 18. The mast trailing edge 21 on the other hand is straight and extends from the most downstream part 22 of the mast 15 which intersects with nacelle 10, to the exhaust outlet 18. These configurations of the leading and trailing edges 19 and 21 enhance the aerodynamic performance of the breather outlet 12 thereby decreasing its drag.

During operation of the gas turbine engine mounted within the nacelle 10, oil is expelled in small quantities from the engine gearbox into the breather outlet duct 17. That oil and the air in which it is suspended flows through the duct 17 to be finally exhausted in a generally downstream direction through the exhaust outlet 18. By exhausting the oil in generally downstream direction, in this manner the oil is caused to follow a path which ensures that at least the majority of it does not come into contact with the nacelle 10 to an extent likely to lead to staining of the nacelle 10. A further benefit arising from exhausting the oil/air mixture in this way is that it provides a limited degree of thrust which goes at least some way towards off-setting the aerodynamic drag resulting from the presence of the mast 15.

Additional benefits which accrue from breather outlets 12 in accordance with the present invention are that they are not prone to blockage through icing and also that they do not result in the generation of back pressure within the breather duct 17. Such a back pressure could result in an undesirable effect on internal air blown seals located around bearing chambers within the engine.

I claim:

1. A breather outlet suitable for use with a gearbox of an aircraft mounted gas turbine engine enclosed within a nacelle comprising a mast adapted to be located on said engine nacelle, said mast being aerodynamically shaped and containing a breather duct, said breather duct being operationally interconnected with an interior of said gearbox and having an exhaust outlet which is generally rearwardly facing with respect to the operational flow of air over said mast, and positioned to be spaced apart from said nacelle to minimize interaction between any efflux from said exhaust outlet and said nacelle, wherein the leading edge of said mast, with respect to the operational flow of air over said nacelle, is curved in a convex manner and extends from the most upstream part of said mast, with respect to said operational flow of air, to said exhaust outlet, wherein the trailing edge of said mast is straight, said trailing edge extending to said exhaust outlet, said exhaust outlet being the most downstream part of said mast, which is operationally adjacent said nacelle, to said exhaust outlet.

2. A breather outlet as claimed in claim 1 wherein the plane of said exhaust outlet is canted so as to be directed slightly away from said nacelle when said mast is mounted on said nacelle.

3. A breather outlet as claimed in claim 1 wherein said exhaust outlet of said breather duct is of circular cross-sectional shape.

4. A gas turbine engine provided with a breather outlet as claimed in claim 1.

5. The breather outlet of claim 1, wherein the exhaust outlet of the duct lies substantially in a plane, said plane being canted with respect to the nacelle so that the exhaust outlet faces slightly away from the nacelle.

6. The breather outlet of claim 1, wherein the duct intersection area has an oblong shape.

* * * * *